United States Patent [19]

Miyakoshi et al.

[11] Patent Number: 4,519,471
[45] Date of Patent: May 28, 1985

[54] MULTI-CYLINDER ENGINE MOUNTED ON MOTORCYCLE

[75] Inventors: Shinichi Miyakoshi; Kazuo Oyama, both of Saitama, Japan

[73] Assignee: Honda Giken Kogyo Kabushiki Kaisha, Tokyo, Japan

[21] Appl. No.: 425,610

[22] Filed: Sep. 28, 1982

[30] Foreign Application Priority Data

Sep. 28, 1981 [JP] Japan .................. 56-152029

[51] Int. Cl.³ .................. B62M 7/00; F02B 75/22
[52] U.S. Cl. .................. 180/219; 123/55 R; 123/55 VF
[58] Field of Search .................. 180/219, 228, 225; 123/55 VF, 55 VS, 55 VE, 55 V, 52 MV, 55 R

[56] References Cited

FOREIGN PATENT DOCUMENTS

| 488156 | 9/1918 | France | 180/219 |
| 1083103 | 1/1955 | France | 180/225 |
| 56-50259 | 5/1981 | Japan | 123/55 VF |
| 2052412 | 1/1981 | United Kingdom | 180/219 |

*Primary Examiner*—John A. Pekar
*Attorney, Agent, or Firm*—Sughrue, Mion, Zinn, Macpeak & Seas

[57] ABSTRACT

A multi-cylinder engine mounted on a motorcycle includes at least two cylinders arranged in a V-configuration. At least one cylinder of the engine extends downwardly and frontwardly relative to the motorcycle. The remaining cylinder(s) of the engine extend upwardly and frontwardly, and the lower and upper cylinders define a obtuse angle therebetween in a vertical plane.

6 Claims, 11 Drawing Figures

4,519,471

MULTI-CYLINDER ENGINE MOUNTED ON MOTORCYCLE

BACKGROUND OF THE INVENTION

The present invention relates to a multi-cylinder engine mounted on a motorcycle.

The number of the cylinders of an internal combustion engine to be mounted on a motorcycle or the like has lately been increased with a view to increasing the upper limit r.p.m. of the engine, to thereby improve engine output power. However, if the cylinders are arranged in the longitudinal direction of the vehicle body, the wheel base of the vehicle is so prolonged as to invite an increase in body weight.

On the contrary, as shown in FIG. 1 a motorcycle which mounts thereon a series multi-cylinder internal combustion engine c having its cylinders b arranged at a right angle with respect to the longitudinal direction of the body a, as shown in FIGS. 1 to 4, has a shorter wheel base, to attain an advantage in body weight. However, the widthwise size of the engine is increased with the increase in the number of the cylinders so that the banking angle $\theta_{Ai}$ (wherein the letter i designates the number of the cylinders) of the motorcycle is reduced to lower the turning velocity.

On the other hand, if the internal combustion engine is arranged at an upper portion of the body so as to increase the banking angle $\theta_{Ai}$, the center of gravity is shifted upwardly to invite a deterioration in slaloming performance.

Further, some motorcycles having a multi-cylinder engine mounted thereon have a construction wherein respective cylinders are equipped with independent carburetors. In this construction, the mounting directions of the respective cylinders are determined exclusively by physical restrictions, e.g., the body structure and the engine mounting positions.

On the other hand, since the carburetor itself is remarkably sensitive to dynamic pressure, vacuum, temperature and the air flow rate, the characteristics of the engine are highly influenced by these parameters. In a multi-cylinder engine having its respective cylinders equipped with independent carburetors, therefore, the carburetors are desirably arranged identically to one another as much as possible.

SUMMARY OF THE INVENTION

It is therefore an object of the present invention to provide a multi-cylinder engine capable of preventing body weight increase.

Another object of the invention is to provide such an engine capable of providing a relatively large lateral body inclination angle during curving travel, yet providing the center of gravity of the resultant motorcycle at a low position.

Still another object of the invention is to provide a space for positioning carburetors for each of the cylinders of the engine, yet minimizing the longitudinal length of the frame of the motorcycle.

These and other objects of the invention will be attained by the downward and frontward extension of at least one cylinder of the multi-cylinder engine. Remaining cylinder(s) of the engine extend upwardly and frontwardly, and the lower and upper cylinders define an obtuse angle in a vertical plane. The lower cylinder is disposed at a position offset from the lateral sides defined by the upper cylinder(s).

DETAILED DESCRIPTION OF THE PREFERRED EMBODIMENTS

Figure 5:
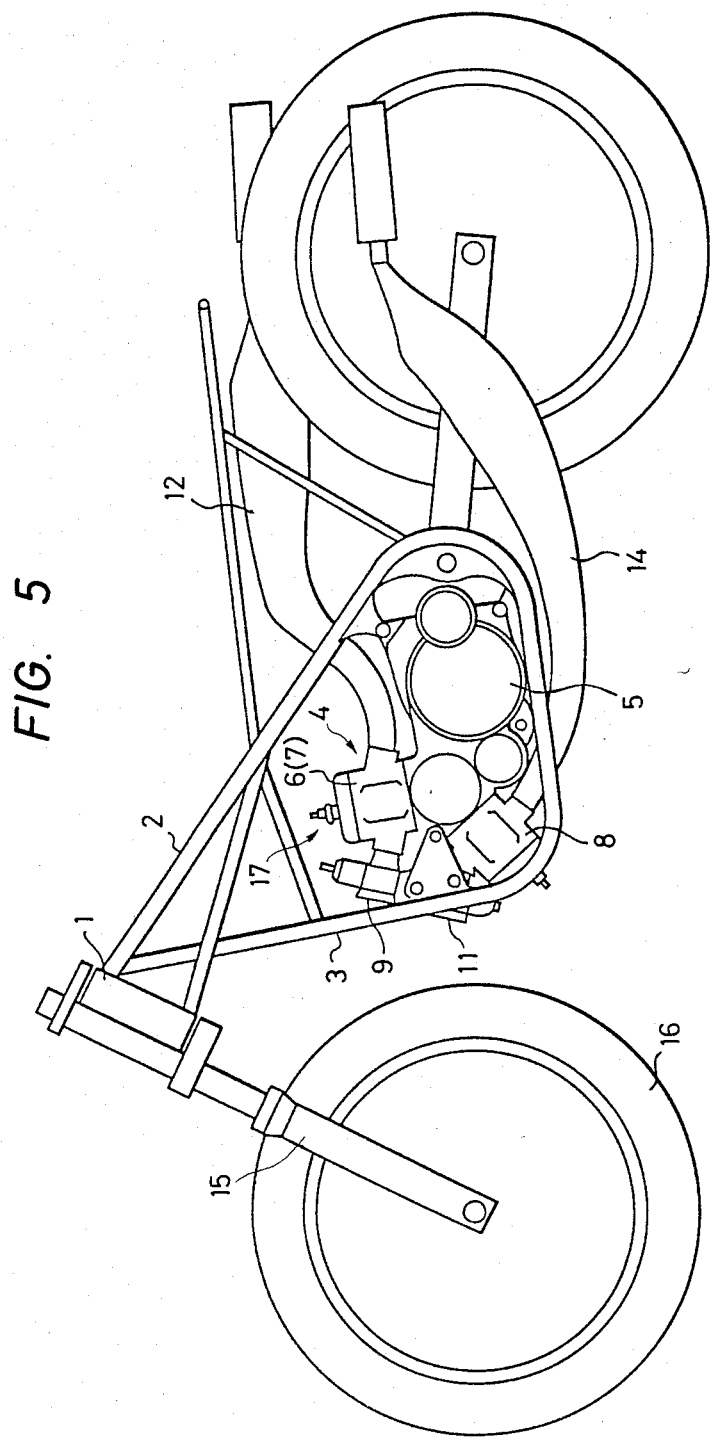
FIG. 5 is a side elevation showing a motorcycle on which one embodiment of the multicylinder internal combustion engine according to the present invention is mounted.

A V-type three-cylinder internal combustion engine will be described in the following as one embodiment of the present invention with reference to FIGS. 5 to 7. In FIG. 5, reference numerals 1, 2 and 3 indicate a steering head, an upper frame and a lower frame, respectively. The frames 2 and 3 are formed into the so-called "double cradle" frame structure, composed of two such tubes, respectively, symmetrically attached to the steering head 1, but the present device is not limited to such a construction. In the space defined by said double cradle frame, there are disposed a multi-cylinder engine, e.g., a three-cylinder engine 4 and a crankcase 5, which are attached to the frame in a well-known manner. In front of the frames 2 and 3, a pair of front forks 15 are movably supported, and a front wheel 16 is rotatably supported on the forks 15. Of the respective cylinders 6, 7 and 8, the cylinders 6 and 7 are attached to the engine 4 so that they are juxtaposed to each other in an identical horizontal plane and are directed generally upward, whereas the remaining cylinder 8 is arranged so that it is positioned below the aforementioned two cylinders 6 and 7 and such that it is directed in a direction between the front portion and the lower portion (i.e., toward the ground) of the vehicular body. The detail of that arrangement is shown in FIG. 6.

Specifically, in the center of the frame 3, there is disposed a V-type three-cylinder two-cycle internal combustion engine 4 which has its cylinders arranged at a right angle with respect to the longitudinal direction of the body 1. The central cylinder 8 is directed downwardly from the front whereas the left and right cylinders 6 and 7 are directed obliquely upwardly to the front at an angle $\theta'$ larger than 90 degrees with respect to the central cylinder 8. (See FIG. 7).

To the upper portion of the central cylinder 8 and to the front portions of the left and right cylinders 6 and 7, furthermore, there are respectively attached carburetors 17 which have identical specifications.

Figure 6:
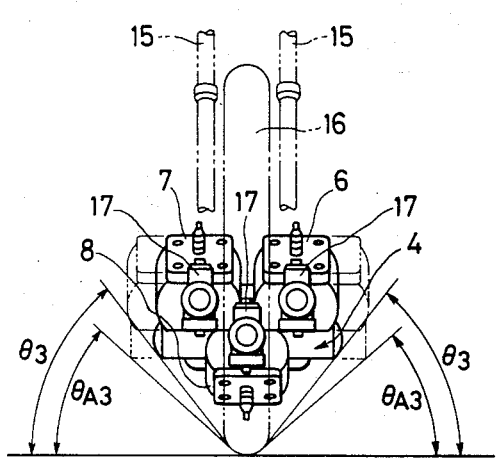
FIG. 6 is a front elevation of the same.
Figure 7:
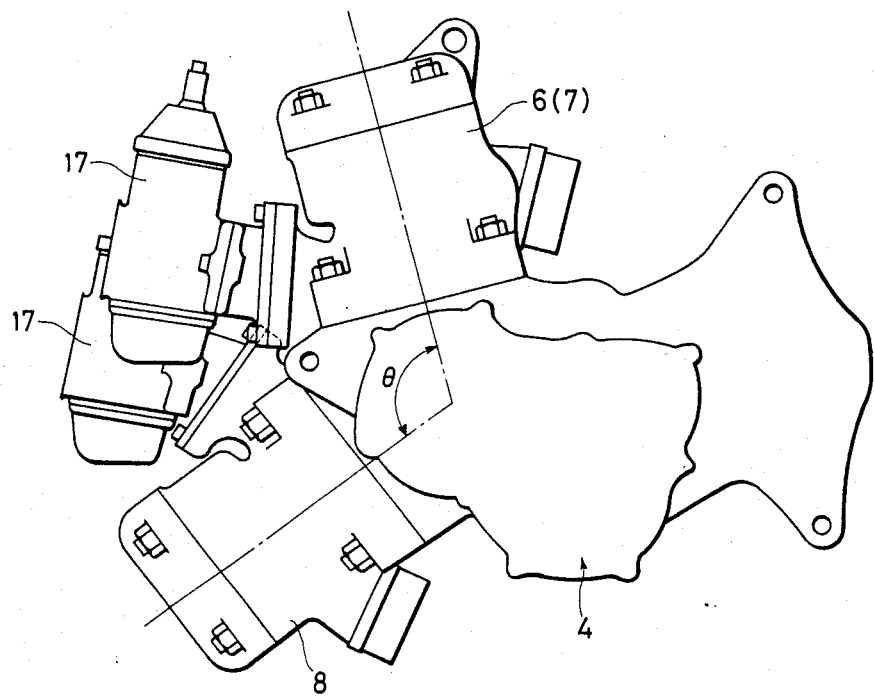
FIG. 7 is an enlarged side elevation showing an essential portion of the same.

In the embodiment shown in FIGS. 5 to 7, as has been described hereinbefore, the left and right cylinders 6 and 7 are arranged at an obtuse angle with respect to the central cylinder 8. As a result, the cylinders 6, 7 and 8 do not interfere with one another so that the total width of the engine 4 can be reduced. Moreover, since the central cylinder is disposed at a lower level, the center of gravity of the engine can be lowered.

Figure 1:
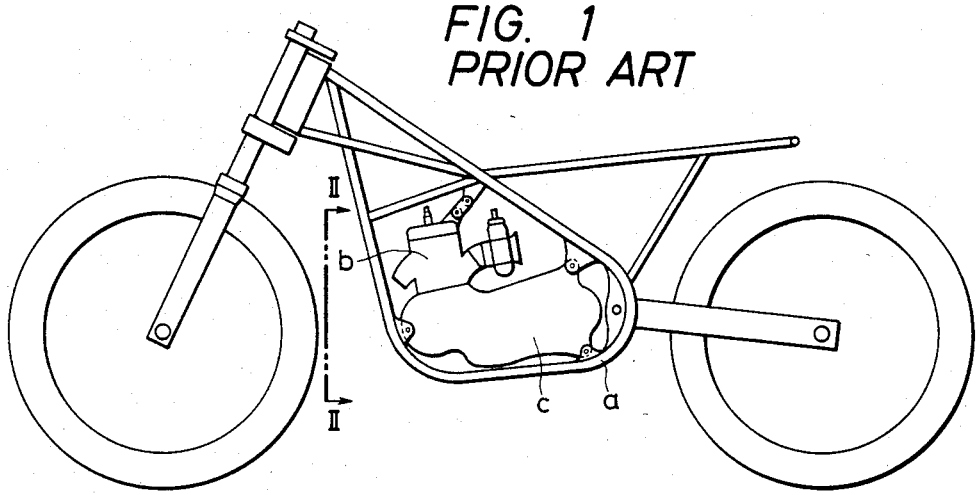
FIG. 1 is a side elevation showing a motorcycle having a conventional three-cylinder internal combustion engine mounted thereon.
Figure 2:
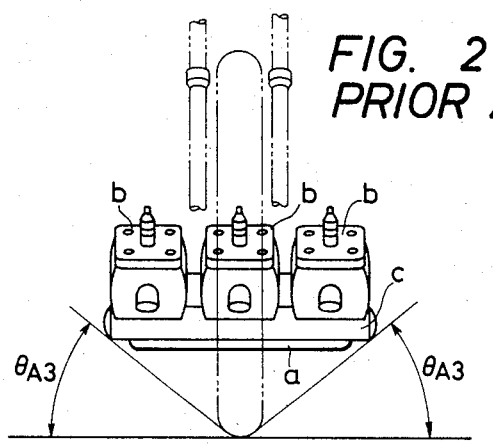
FIG. 2 is a front elevation of the same.

Furthermore, the central cylinder 8 is inclined at a downwardly directed angle whereas the left and right cylinders 6 and 7 are directed at ane elevation angle $\theta'$ larger than a right angle to the front. As a result, even if the engine 4 is shifted downwardly, the bank angles $\theta_3$ (FIG. 6), which are defined between the ground point of the wheel 16 and the largest lateral protrusion of the engine 4 in the obliquely upward direction along the transverse direction of the vehicle, are allowed to assume a large value so that turning performance and slaloming performance, which might otherwise be incompatible, can be simultaneously satisfied. In FIG. 6, the bank angles $\theta_3$ of the present invention are compared with the like angles $\theta_{A3}$ resulting with the in-line three cylinder configuration of the prior art (FIG. 2).

Figure 8:
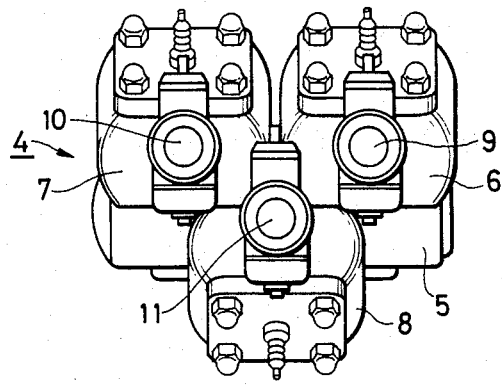
FIG. 8 is a front elevation showing only the engine portion, as viewed from the front of the vehicular body of FIG. 1.
Figure 9:
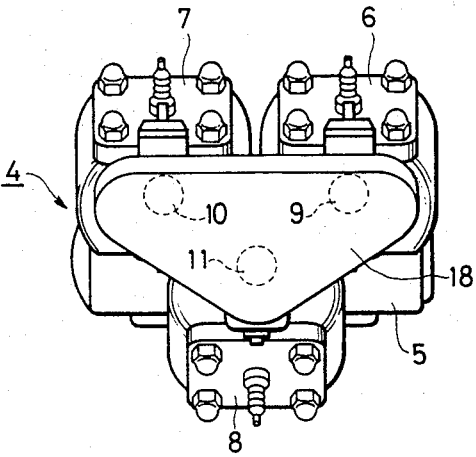
FIG. 9 is a front elevation showing the engine portion with the carburetor cover attached.

Moreover, the left and right cylinders 6 and 7, which are disposed at higher positions, and the central cylinder 8 which is disposed at a lower position, can be positioned at optimum angles, to thereby provide a space allowing the carburetors 17 to be attached to the cylinders 6, 7 and 8 so that the intake pipes can be set at the most proper length. To be more specific, as shown in FIGS. 8 and 9, the respective carburetors, which are independently attached to the cylinders 6, 7 and 8, respectively, can all have their air intake ports 9, 10 and 11 arranged substantially forwardly of the vehicle. Incidentally, the respective exhaust pipes of the cylinders 6 and 8 are indicated at 12 and 14 in FIG. 5, with the exhaust pipe of the cylinder 7 juxtaposed with the exhaust pipe 12 (although not shown).

With the construction thus far described, the carburetors all have their air intake ports arranged in the same direction and forwardly of the body so that they are set and arranged under the same conditions of dynamic pressure, vacuum, temperature and air flow rate.

As shown in front elevation of FIG. 9, moveover, only one carburetor cover 18 for adjusting the dynamic pressure during the running operation and for protecting the carburetors against foreign obstacles is sufficient, resulting in marked advantages in design and cost.

Figure 3:
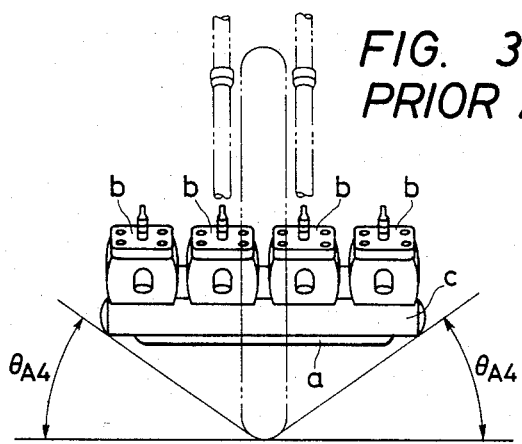
FIGS. 3 and 4 are front elevations of motorcycles on which four- and two-cylinder internal combustion engines are mounted, respectively.
Figure 10:
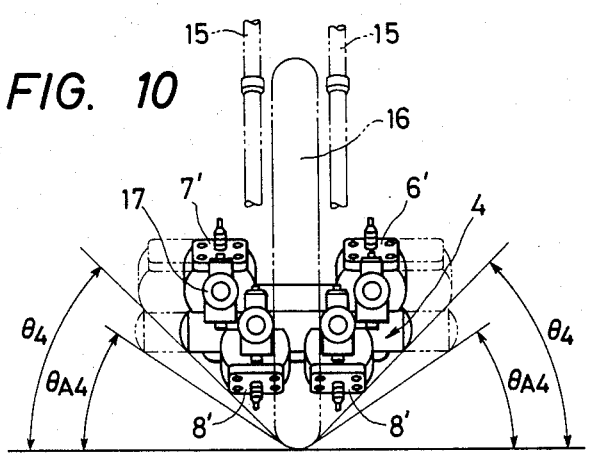
FIGS. 10 and 11 are front elevations showing other embodiments, respectively.

The embodiment shown in FIGS. 5 to 9 is directed to a V-type three-cylinder engine which has its central cylinder directed downwardly. However, the present invention can also be applied to a V-type four-cylinder engine having two central cylinders directed downwardly and the two side cylinders directed upwardly at an angle larger than 90 degrees with respect to the central cylinders, as shown in FIG. 10. As a result, effects similar to those of the embodiment shown in FIGS. 5 to 9 can be provided. FIG. 10 compares the banking angles $\theta_4$ produced via the invention with those of the four cylinder engine of the prior art ($\theta_{A4}$, FIG. 3).

Figure 4:
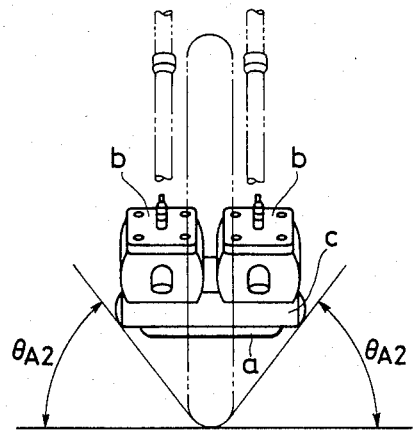
Figure 11:
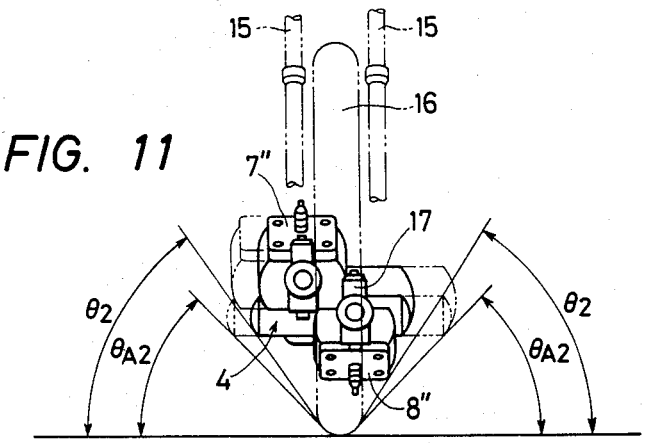

As has been described hereinbefore, furthermore, the present invention can be applied to a V-type two cylinder engine having its left or right cylinder downwardly inclined and its other cylinder inclined at an elevation angle larger than 90 degrees, as shown in FIG. 11, which compares the banking angle of the invention, $\theta_2$, with that of the prior art configuration, $\theta_{A2}$, of FIG. 4.

In view of the foregoing, according to the present invention, suitable steering stability is obtainable because of optimum multicylinder engine layout. Further, such layout provides space to allow the carburetors to be connected to the cylinders in an advantageous fashion. The carburetors of the multicylinder engine are arranged so as to have their intake ports all held under substantially the same conditions, so that there can be attained advantages in that the performance characteristics of the engine can be improved and the carburetor cover can be made as a singular element.

While the invention has been described in detail and with reference to specific embodiments thereof, it will be apparent to one skilled in the art that various changes and modifications can be made therein without departing from the spirit and scope of the invention.

What is claimed is:

1. In a motorcycle-mounted multicylinder engine, the improvement comprising; said engine having at least two cylinders arranged in a V-configuration, at least one of said cylinders comprising a lower cylinder extending downwardly and offset forwardly relative to the other cylinder, and a plurality of carburetors in equal numbers to said cylinders and positioned in front thereof, each of said carburetors being provided with an air intake port directed generally frontwardly of said motorcycle.

2. The improvement of claim 1, said at least one lower cylinder and at least one remaining cylinder comprising an upper cylinder being disposed at an obtuse angle with respect to each other.

3. A motorcycle, comprising; an engine mounted on said motorcycle having at least two cylinders, one cylinder disposed downwardly and offset forwardly of the other cylinder, and a plurality of carburetors in equal numbers to said cylinders and positioned in front thereof, each of said carburetors being provided with an air intake port directed generally frontwardly of said motorcycle.

4. In a motorcycle-mounted multicylinder engine, the improvement comprising; said engine having at least three cylinders arranged in a V-configuration, at least one of said cylinders comprising a lower cylinder extending downwardly and forwardly relative to another cylinder, said at least one lower cylinder being provided at a position offset from and between planes defined by sides of a row of said remaining upper cylinders, and a plurality of carburetors in equal numbers to said cylinders and positioned in front thereof, each of said carburetors being provided with an air intake port directed generally frontwardly of said motorcycle.

5. The improvement of claim 4, said at least one lower cylinder and at least one remaining cylinder comprising an upper cylinder being disposed at an obtuse angle with respect to each other.

6. In a motorcycle-mounted multicylinder engine, the improvement comprising; said engine consisting of two cylinders comprising an upper cylinder and a lower cylinder, the lower cylinder extending downwardly and offset forwardly relative to the upper cylinder, and a plurality of carburetors in equal numbers to said cylinders and positioned in front thereof, each of said carburetors being provided with an air intake port directed generally frontwardly of said motorcycle.

* * * * *